(12) United States Patent
Borbone

(10) Patent No.: US 6,824,014 B2
(45) Date of Patent: Nov. 30, 2004

(54) ICE SCULPTURE MOLD/WATER COOLER CONTAINER

(76) Inventor: John C. Borbone, 21 Kohlbocker Rd., Fredon, NJ (US) 07860

(*) Notice: Subject to any disclaimer, the term of this patent is extended or adjusted under 35 U.S.C. 154(b) by 108 days.

(21) Appl. No.: 10/073,749

(22) Filed: Feb. 11, 2002

(65) Prior Publication Data
US 2003/0150878 A1 Aug. 14, 2003

(51) Int. Cl.7 .................................................. B67D 5/00
(52) U.S. Cl. ...................... 222/78; 222/185.1; D9/311
(58) Field of Search ........................... 222/185.1, 78; D7/301; D9/311

(56) References Cited

U.S. PATENT DOCUMENTS

| | | | | |
|---|---|---|---|---|
| 909,467 A | * | 1/1909 | Shaw | 63/20 |
| 2,526,225 A | * | 10/1950 | Gronemeyer et al. | 215/354 |
| 4,073,397 A | * | 2/1978 | Snodgrass | 215/385 |
| 5,305,927 A | * | 4/1994 | Caveza | 222/185.1 |
| 5,329,714 A | * | 7/1994 | Lee | 40/409 |
| 5,409,094 A | * | 4/1995 | Muraco | 194/317 |
| D389,687 S | * | 1/1998 | Frankel | D6/545 |
| D459,213 S | * | 6/2002 | Buboltz et al. | D9/311 |

* cited by examiner

Primary Examiner—Philippe Derakshani
(74) Attorney, Agent, or Firm—Kenneth P. Glynn

(57) ABSTRACT

The present invention is a combination ice sculpture mold and water cooler container which may be used to freeze a liquid and then cut open to create a frozen sculpture, and it alternatively may be used as a water or other liquid supply in its inverted, open position with a "water cooler", i.e. a bottled-liquid receiving liquid dispenser. It could be used for both purposes—first with a water cooler and subsequently as an ice sculpture. Alternatively, it may be kept in tack and used as an enclosed "ice sculpture" and subsequently reused for either purpose. It includes a hollow plastic container having a top, a bottom and sidewalls, and a neck and dispensing orifice at its top. The present invention hollow plastic container has a three dimensional sculpture mold formed out of at least one of its sidewalls. The sculpture mold depicts a recognizable unique three-dimensional form of a physical object. The physical object has a recognizable top and a recognizable bottom, and is formed in the container invented relative to the container so that the physical object top is biased toward the bottom of the container and the physical object bottom is biased toward the top of the container. Another embodiment includes the aforesaid container in combination with a liquid dispenser, e.g., a water cooler. In another embodiment, the invention is a container having a float contained therein with a weighted configuration to assure a predetermined orientation thereof during floatation.

16 Claims, 4 Drawing Sheets

ICE SCULPTURE MOLD/WATER COOLER CONTAINER

BACKGROUND OF THE INVENTION

1. Field of the Invention

The present invention relates to a dual use product—one that may be used as a water cooler with a sculptured three dimensional object form, and may alternately be used to freeze liquid, e.g. colored water, and cut open to mold frozen sculpture for winter or subzero environment display.

2. Information Disclosure Statement

Designed bottles have existed for years, formed of glass or plastic, e.g. the Abe Lincoln savings bank, the Planters' Peanuts jar, etc.

Likewise, water coolers with delivered, interchangeable plastic bottles of water have also successful for decades. However, in the present invention, a water cooler bottle has a three dimensional sculpture object molded into its sidewalls in an inverted fashion so that the bottle itself may be inverted for use so as to upright the sculptured object during water dispensing.

Notwithstanding the prior art, the present invention is neither taught nor rendered obvious thereby.

SUMMARY OF THE INVENTION

The present invention involves a combination ice sculpture mold and water cooler container which may be used to freeze a liquid and then cut open to create a frozen sculpture, and it alternatively may be used as a water or other liquid supply in its inverted, open position with a "water cooler", i.e. a bottled-liquid receiving liquid dispenser. It could be used for both purposes—first with a water cooler and subsequently as an ice sculpture. In the alternative, it could be kept in tack and used as an enclosed "ice sculpture" and subsequently reused for either purpose.

It includes a hollow plastic container having a top and a bottom and sidewalls and having a neck at its top, with the neck having a dispensing orifice. By "sidewalls" is meant both the singular and the plural. Hence, a rectangular footprint container would have four sidewalls, while a cylindrical container would only have one sidewall.

The present invention hollow plastic container has a three dimensional sculpture mold formed out of at least one of its sidewalls. In preferred embodiments, it is formed out of all of its sidewalls, i.e., using at least a portion of each sidewall for the three dimensional sculpture mold. The sculpture mold depicts a recognizable unique three-dimensional form of a physical object. The physical object has a recognizable top and a recognizable bottom, and is formed in the container invented relative to the hollow plastic container so that the physical object top is biased toward the bottom of the container and the physical object bottom is biased toward the top of the container. In other words, when the container is upright, the physical object is upside down, and vice versa.

The container may be filled with a liquid and be stored and shipped upright with its bottom facing earth and the sculpture upside down, and subsequently placed in a water dispenser for liquid dispensing in an inverted position, thereby displaying the physical object in its upright position. Alternatively, the container may be filled with liquid, frozen, displayed as an ice sculpture, or cut open and stripped to produce a molded, frozen sculpture.

In some embodiments, the combination ice sculpture mold and water cooler container of the present invention has a substantially flat top and a substantially flat bottom. This renders it more easily set up and stable in its upright position and in its inverted position. In other embodiments, one of the top and the bottom may be flat, or neither may be flat.

In general, the sculpture may be located in an area anywhere on, or throughout the structure of the container. In some preferred embodiments, the sidewalls have a top region, a middle region, and a bottom region, and the sculptured object is located in the middle region. This mode allows for more flat surface areas at the top and bottom of the container, as well as increased inside volume, i.e. capacity.

The present invention container may have a circular outer periphery from top view. Alternatively, it may have a rectangular outer periphery from top view, e.g. a square top view, although any shape from a top view, irregular or regular shaped, could be used. The square, circular, or rectangular configuration makes multiple unit storage, encasement, transport, etc. more convenient, hence these shape choices are preferred.

In order to avoid a frozen sculpture with a base having a protruded ice cylinder (from the upper neck using a normal cap) that would be difficult to stand up on a flat surface, either of two approaches may be taken. First, the container may be filled below the neck level and frozen while upright. Second, a cap may be used, which has a pintal which extends into substantially all of the neck, to displace the open space in the neck and prevent the formation of a frozen plug or cylinder. The container is filled and may be frozen upright or inverted.

In another embodiment, the present invention is a water cooler system. It includes a water dispenser having a top with a support area for receiving an inverted hollow plastic container, with an inlet on its top for receiving an open neck of an inverted hollow plastic container. It has a spigot with an outlet connected to the inlet. The spigot has an open position and a closed position for respectively permitting and preventing flow from an inverted hollow plastic container having a liquid therein from the inlet to the outlet. It also includes the hollow plastic container described above.

Typically, the water dispenser inlet includes a liquid holding area with a refrigerator mechanism for cooling liquid contained within the liquid holding area, although, for some purposes, the inclusion of refrigerator is unnecessary. Also, although "water" is used herein throughout the application, any flowable liquid could be used in place of water, e.g. colored water, lemonade, cola, fruit juice, liquor, etc.

In yet another embodiment, the present invention water container includes: (a) a hollow plastic container having a top and a bottom and sidewalls and having a neck at its top, with a dispensing orifice; and, (b) a float contained inside the hollow plastic container for floatation atop liquid within the container. The float has a hollow upper area and a weighted lower area so as to maintain a predetermined orientation when afloat. In some preferred embodiments, the float includes at least one presentation area adapted to contain a presentation selected from the group consisting of written messages, logos, three dimensional, recognizable physical objects, and combinations thereof. For example, the float may be made of a hollow plastic material which contains more mass of plastic material in its lower area than in its upper area. Alternatively, it could contain or have a weight attached to its bottom.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
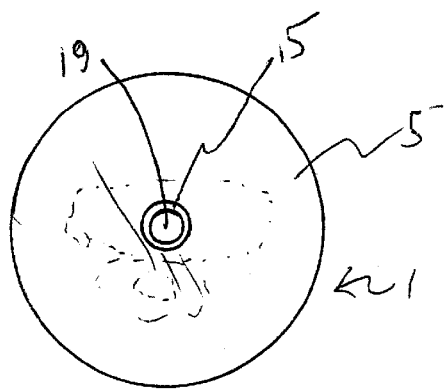
FIG. 1 shows a top view and FIG. 2 shows a side view of one embodiment of the present invention combination ice sculpture mold and water cooler container with a three dimensional, inverted, recognizable physical object form on its sidewalls.
Figure 2:
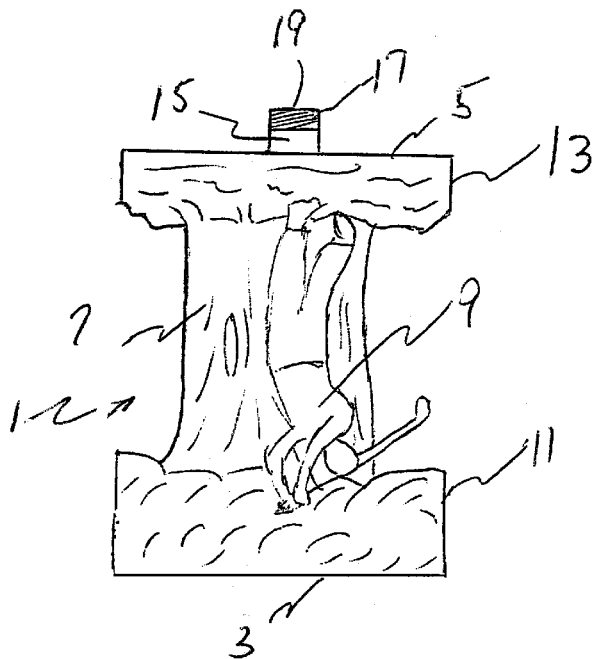

FIG. 1 shows a top view and FIG. 2 shows a side view, respectively, of a present invention combination ice sculpture mold and water cooler container 1. It has a bottom 3, a top 5, and a cylindrical sidewall with upper section 13, lower section 11 and middle section 7 with a three dimensional, inverted, recognizable physical object in this case a golfer 9 in front of a tree. Here, upper section 13 and lower section 11 are full width to accommodate increased capacity than it would otherwise accommodate. There is a neck 15 and a dispensing orifice 19. Neck 15 has threads 17 for attachment of a cap. It may be filled with bottled water or other liquid, capped for transport and storage, and opened for use as desired.

Figure 3:
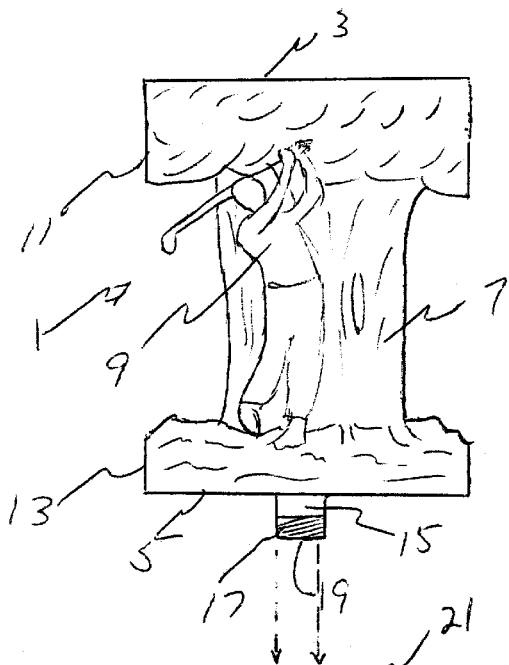
FIG. 3 shows present invention combination ice sculpture mold and water cooler container shown in FIGS. 1 and 2, but now inverted and being inserted into the top of a water cooler dispenser.

FIG. 3 shows the present invention combination ice sculpture mold and water cooler container 1 shown in FIGS. 1 and 2, with identical elements identically numbered. In this Figure, the cap has been removed and container 1 is shown being inverted and being inserted into the top of a water cooler dispenser 2, at the water dispenser top 21, which has a receiving inlet adapted to accommodate the container 1. The internals of a water cooler are well known and need not be expounded upon here. Spigot 23 turns the flow of liquid from container 1 on and off, as a user may desire. As can be seen in FIG. 3, now that the container 1 is inverted, the three dimensional sculpture is upright and presents an attractive display during use of the container 1.

Figure 4:
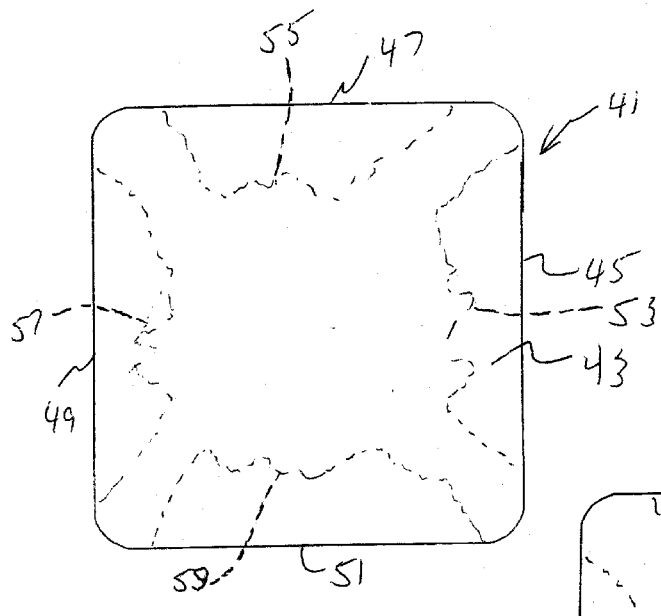
FIG. 4 show a bottom view.
Figure 5:
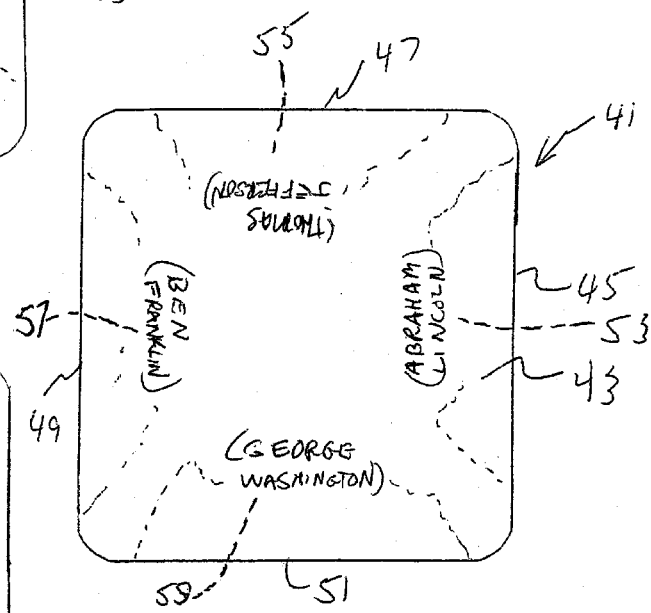
FIG. 5 shows a bottom diagrammatic view and FIG. 6 shows a side view of another embodiment of the present invention combination ice sculpture mold and water cooler container wherein four different three dimensional, physical objects are presented on four different sidewalls, in this case, historical busts.
Figure 6:
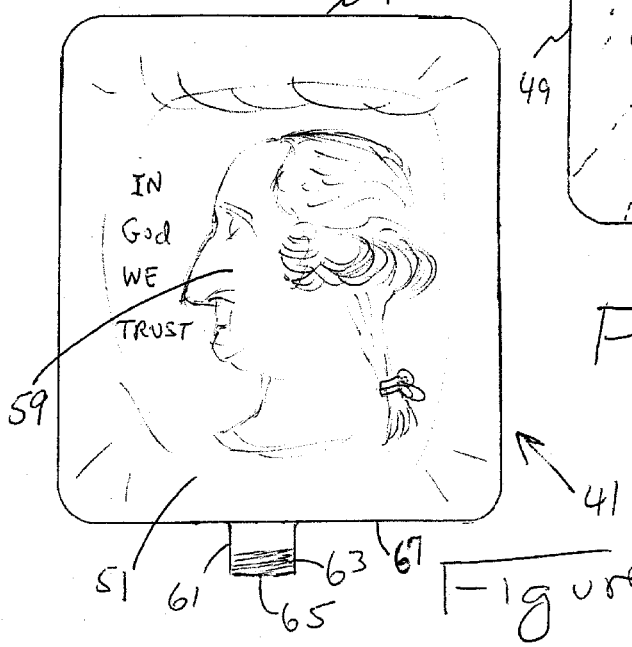

FIG. 4 show a bottom view and FIG. 5 shows a bottom diagrammatic view and FIG. 6 shows a side view of another embodiment of the present invention combination ice sculpture mold and water cooler container 41. It includes a top 67, a bottom 43, and four sidewalls 45, 47, 49, and 51, as well as a neck 61 with threads 63 and dispensing orifice 65. FIG. 4 shows a bottom view looking into the relatively clear plastic, wherein there are four separate, different three dimensional, physical objects are presented on the four different sidewalls, in this case, historical busts. Thus, FIG. 4 illustrates and FIG. 5 schematically shows Abe Lincoln 53, Thomas Jefferson 55, Ben Franklin 57, and George Washington 59. FIG. 6 shows a view of sidewall 51 with three dimensional sculpture George Washington 59. In this embodiment, a different sculpture is seen on each side of container 41.

Figure 7:
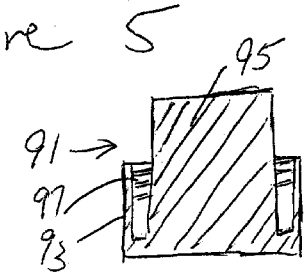
FIG. 7 shows a side cut view of one embodiment of a cap which may be utilized in conjunction with a present invention combination ice sculpture mold and water cooler container.
Figure 8:
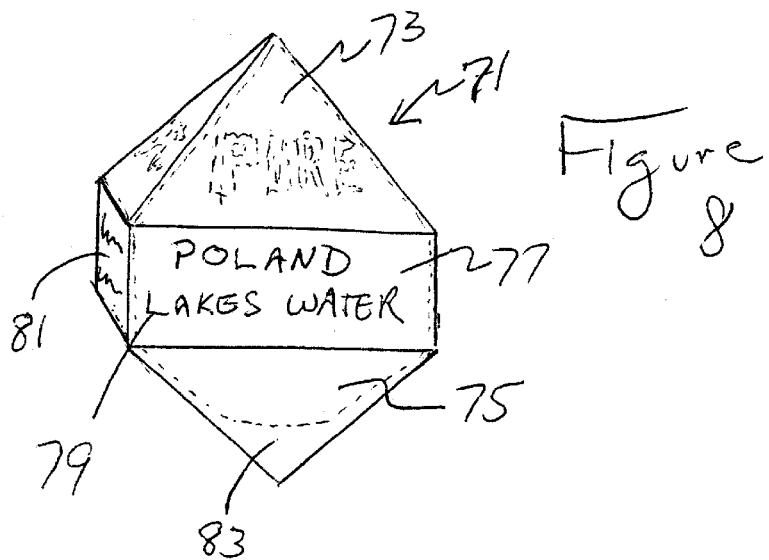
FIG. 8 shows a present invention ice sculpture mold and water cooler container float and FIG. 9 shows a present invention ice sculpture mold and water cooler container with the FIG. 8 float contained therein; and, FIGS. 10 and 11 illustrate alternative embodiment containers of the present invention which do not have flat bottoms.
Figure 9:
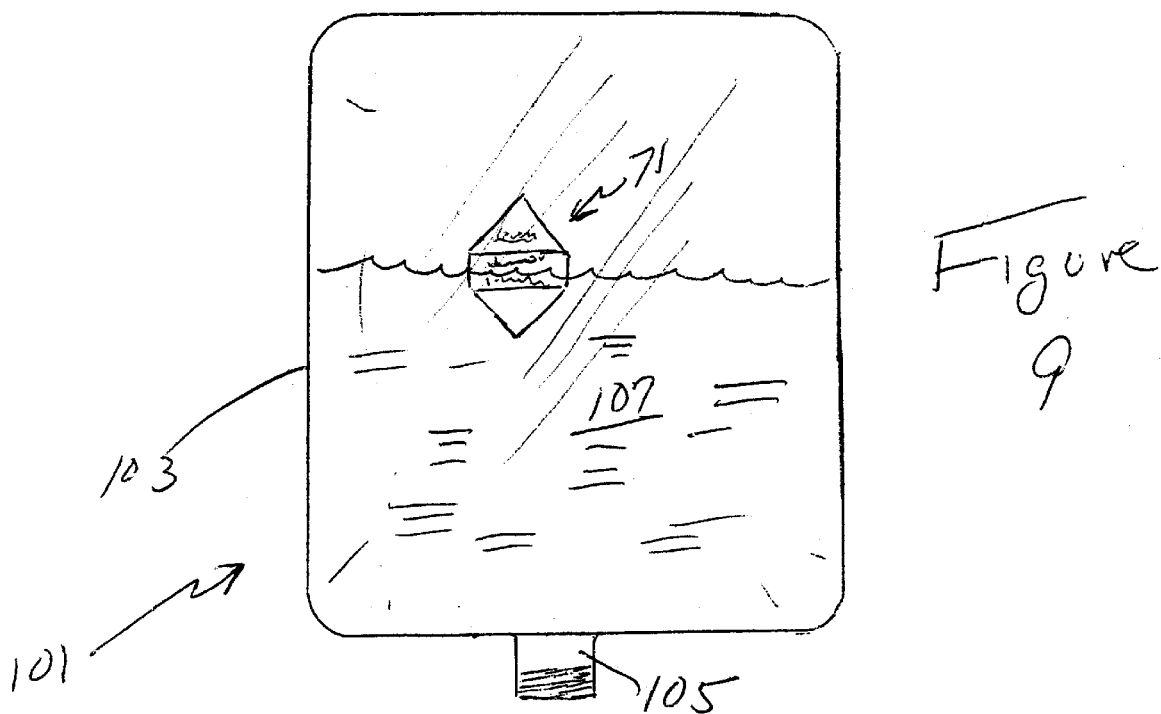

FIG. 7 shows a side cut view of one embodiment of a cap 91, which has a standard cap sidewall 93 with internal threads 97 for screwing and unscrewing to and from a container, such as container 41 above (FIGS. 4, 5, 6). When used in conjunction with any present invention combination ice sculpture mold and water cooler container, the pintal 95 protrudes into the container neck, substantially or fully, and displaces air/water to assure that a frozen liquid sculpture would not end up with a frozen plug form the neck, which would otherwise make it unstable for placement on its own FIG. 8 shows a present invention ice sculpture mold and water cooler container float 71 and FIG. 9 shows a present invention ice sculpture mold and water cooler container 101 with the FIG. 8 float 71 contained therein. In FIG. 8, float 71 has an upper section 73, a middle section 77, and a bottom section 75. Although float 71 is hollow and externally symmetrical, bottom section 75 has significantly thicker portion 83, adding sufficient weight so that when afloat, it remains oriented as sown i.e., with top 73 section facing up. Advertising, logos messaging and three dimensional objects maay be presented theron as shown or otherwise desired.

Figure 10:
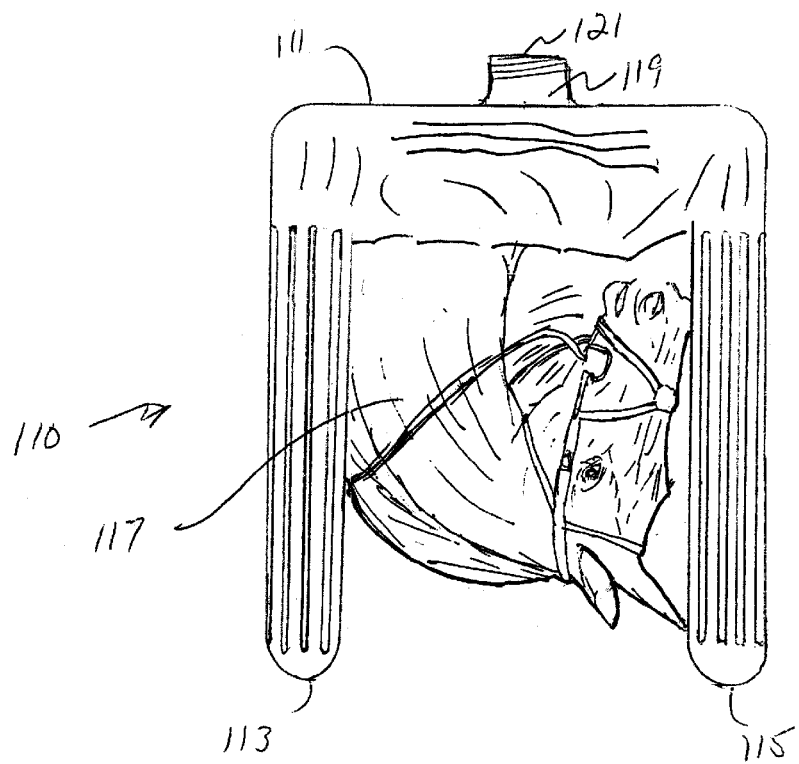
Figure 11:
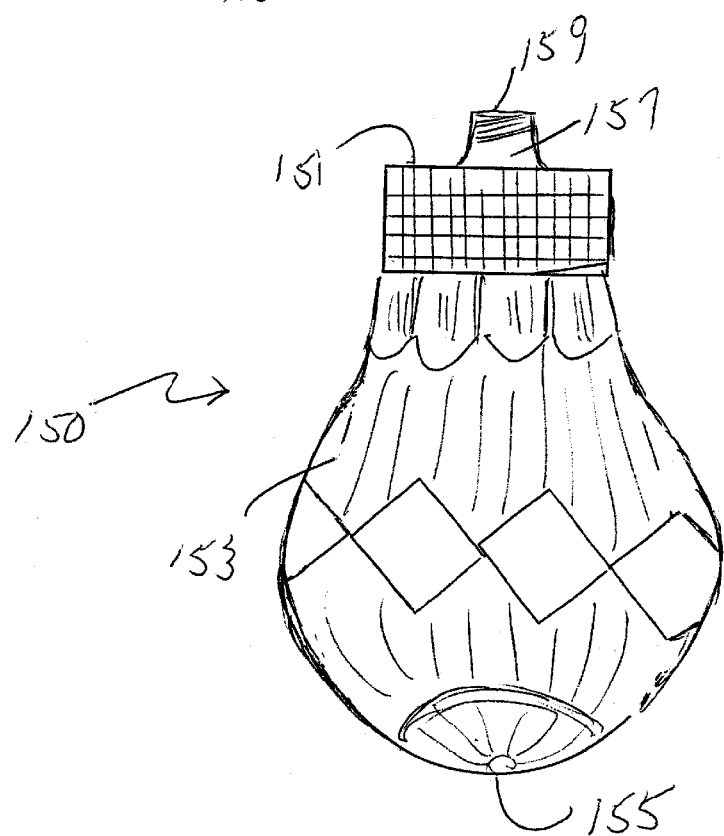

FIGS. 10 and 11 illustrate alternative embodiment containers of the present invention that do not have flat bottoms. FIG. 10 shows present invention container 110 with top 111, neck 199 and dispensing orifice 121. It has legs which are pillars and are exemplified by pillars 113 and 115, with rounded bottoms. There is no flat bottom in this embodiment, but there is a substantially flat top 111. Inverted horse head 117 becomes an attractive three dimensional presentation when container 110 is inverted, as well as an attractive mold for a frozen food colored water sculpture.

In FIG. 11, there is neither a flat top nor a flat bottom. Container 150 is an inverted hot air balloon 153, with a bottom 155, a top 151, a neck 157 and orifice 159. When the container is inverted, the balloon is uprighted to make an interesting three dimensional presentation.

Obviously, numerous modifications and variations of the present invention are possible in light of the above teachings. It is therefore understood that within the scope of the appended claims, the invention may be practiced otherwise than as specifically described herein.

What is claimed is:

1. A combination ice sculpture mold and water cooler container which comprises:

a hollow plastic container having a top and a bottom and sidewalls and having a neck at its top, said neck having a dispensing orifice, said sidewalls having a top region, a middle region and a bottom region;

said hollow plastic container having a three dimensional sculpture mold formed out of at least one of its sidewalls in said middle region whereby said top and said bottom of said sidewalls are substantially flat, said sculpture mold depicting a recognizable unique three dimensional form of a physical object, said physical object having a recognizable top and a recognizable bottom, said physical object being inverted relative to said hollow plastic container such that the physical object top is biased toward the bottom of said container and such that the physical object bottom is biased toward the top of said container;

wherein said container may be filled with a liquid and be stored and shipped upright with its bottom facing earth and the sculpture upside down, and subsequently inverted and placed in a water dispenser for liquid dispensing, thereby displaying said physical object in its upright position; alternatively, wherein said container may be filled with liquid, frozen, and cut open to produce a molded, frozen sculpture; and alternatively, wherein said container may be filled with liquid, frozen and used as an enclosed molded frozen sculpture and subsequently used for one of liquid dispensing and molded frozen sculpturing.

2. The combination ice sculptures mold and water cooler container of claim 1 wherein said hollow plastic container has a substantially flat top and a substantially flat bottom.

3. The combination ice sculpture mold and water cooler container of claim 1 wherein said sidewalls have a top region, a middle region and a bottom region, and said sculptured object is substantially located in said middle region.

4. The combination ice sculpture mold and water cooler container of claim 1 wherein said container has a circular outer periphery from top view.

5. The combination ice sculpture mold and water cooler container of claim 1 wherein said has a rectangular outer periphery from top view.

6. The combination ice sculptures mold and water cooler container of claim 5 wherein said rectangular outer periphery is square.

7. The combination ice sculpture mold and water cooler container of claim 1 which further includes a cap having a pintal which extends into substantially all of said neck.

8. The combination ice sculpture mold and water cooler container of claim 1 wherein said neck is threaded and adapted to receive a cap having a pintal which extends into substantially all of the said neck.

9. A water cooler system, which comprises:
(a) a water dispenser having a top with a support area for receiving an inverted hollow plastic container, and having an inlet on said top for receiving an open neck of an inverted hollow plastic container, and having a spigot with an outlet connected to said inlet, said spigot having an open position and a closed position for respectively permitting and preventing flow from an inverted hollow plastic container having a liquid therein from said inlet to said outlet; and,
(b) a hollow plastic container having a top and a bottom and sidewalls and having a neck at its top, said neck having a dispensing orifice, said sidewalls having a top region, a middle region and a bottom region;

said hollow plastic container having a three dimensional sculpture mold formed out of at least one of its sidewalls in said middle region whereby said top and said bottom of said sidewalls are substantially flat, said sculpture mold depicting a recognizable unique three dimensional form of a physical object, said physical object having a recognizable top and a recognizable bottom, said physical object being inverted relative to said hollow plastic container such that the physical object top is biased toward the bottom of said container and such that the physical object bottom is biased toward the top of said container;

wherein said container may be filled with a liquid and be stored and shipped upright with its bottom facing earth and the sculpture upside down, and subsequently inverted and placed in a water dispenser for liquid dispensing, thereby displaying said physical object in its upright position; and, alternatively, wherein said container may be filled with liquid, frozen, and cut open to produce a molded, frozen sculpture; and alternatively, wherein said container may be filled with liquid, frozen and used as an enclosed molded frozen sculpture and subsequently used for one of liquid dispensing and molded frozen sculpturing.

10. The water cooler system on claim 9 wherein said water dispenser inlet includes a liquid holding area with a refrigerator mechanism for cooling liquid contained within said liquid holding area.

11. The combination ice sculpture mold and water cooler container of claim 9 wherein said hollow plastic container has a substantially flat top and a substantially flat bottom.

12. The combination ice sculpture mold and water cooler container of claim 9 wherein said sidewalls have a top region, a middle region and a bottom region, and said sculptured object is substantially located in said middle region.

13. The combination ice sculpture mold and water cooler container of claim 9 wherein said container has a circular outer periphery from top view.

14. The combination ice sculpture mold and water cooler container of claim 9 wherein said has a rectangular outer periphery from top view.

15. The combination ice sculpture mold and water cooler container of claim 13 wherein said rectangular outer periphery is square.

16. The combination ice sculpture mold and water cooler container of claim 9 wherein said neck is threaded and adapted to receive a cap having a pintal which extends into substantially all of the said neck.

* * * * *